US008326449B2

(12) United States Patent
Hartz et al.

(10) Patent No.: US 8,326,449 B2
(45) Date of Patent: Dec. 4, 2012

(54) AUGMENTING A VIRTUAL MACHINE HOSTING ENVIRONMENT FROM WITHIN A VIRTUAL MACHINE

(75) Inventors: George Hartz, Salem, NH (US); Chad Nale, Pelham, NH (US); David Fusari, Groton, MA (US)

(73) Assignee: Microsoft Corporation, Redmond, WA (US)

( * ) Notice: Subject to any disclaimer, the term of this patent is extended or adjusted under 35 U.S.C. 154(b) by 1026 days.

(21) Appl. No.: 12/062,610

(22) Filed: Apr. 4, 2008

(65) Prior Publication Data

US 2009/0019436 A1 Jan. 15, 2009

Related U.S. Application Data

(60) Provisional application No. 60/910,288, filed on Apr. 5, 2007.

(51) Int. Cl.
*G06F 12/00* (2006.01)
*G06Q 20/00* (2012.01)

(52) U.S. Cl. ......................................... 700/200; 705/71
(58) Field of Classification Search ........... 717/174–178
See application file for complete search history.

(56) References Cited

U.S. PATENT DOCUMENTS

| 5,961,582 | A | 10/1999 | Gaines | 709/1 |
|---|---|---|---|---|
| 6,397,242 | B1 | 5/2002 | Devine et al. | 709/1 |
| 6,496,847 | B1 | 12/2002 | Bugnion et al. | 709/1 |
| 6,704,925 | B1 | 3/2004 | Bugnion | 717/138 |
| 6,711,672 | B1 | 3/2004 | Agesen | 712/227 |
| 6,725,289 | B1 | 4/2004 | Waldspurger et al. | 710/9 |
| 6,735,601 | B1 * | 5/2004 | Subrahmanyam | 707/999.2 |
| 6,785,886 | B1 | 8/2004 | Lim et al. | 718/1 |
| 6,789,156 | B1 | 9/2004 | Waldspurger | 711/6 |
| 6,795,966 | B1 | 9/2004 | Lim et al. | 718/1 |
| 6,880,022 | B1 | 4/2005 | Waldspurger et al. | 710/9 |
| 6,944,699 | B1 | 9/2005 | Bugnion et al. | 710/269 |
| 6,961,806 | B1 | 11/2005 | Agesen et al. | 711/6 |

(Continued)

FOREIGN PATENT DOCUMENTS

GB 2 378 535 2/2003

(Continued)

OTHER PUBLICATIONS

PCT/US2008/059345, International Search Report, 9 pages, Jul. 31, 2008.

(Continued)

*Primary Examiner* — Don Wong
*Assistant Examiner* — Mohammad Kabir
(74) *Attorney, Agent, or Firm* — Woodcock Washburn LLP

(57) ABSTRACT

Systems and methods augment a virtual machine (computer) hosting environment from within a virtual machine. A communication channel between the virtual machine and the player is used to send instructions to the player to load and execute requested software modules. Requests to load and execute the modules may originate in the corporate network and may be issued by the corporate network administrator. If a requested module is not stored on the host computer, the virtual machine may upload the module, via the communication channel, to the player. The uploaded module may, for example: (a) install a required upgrade in the host operating system; (b) execute virus checking software on the host computer; or (c) install a corporate network-provided secure printing module that enables software being executed by the host computer to print on devices connected to the host computer.

23 Claims, 10 Drawing Sheets

U.S. PATENT DOCUMENTS

| | | | | |
|---|---|---|---|---|
| 6,961,941 | B1 | 11/2005 | Nelson et al. | 719/319 |
| 7,028,305 | B2 | 4/2006 | Schaefer | 719/310 |
| 7,069,413 | B1 | 6/2006 | Agesen et al. | 711/207 |
| 7,082,598 | B1 | 7/2006 | Le et al. | 717/127 |
| 7,089,377 | B1 | 8/2006 | Chen | 711/147 |
| 7,111,086 | B1 | 9/2006 | Ecoleston et al. | 710/33 |
| 7,111,145 | B1 | 9/2006 | Chen et al. | 711/206 |
| 7,117,481 | B1 | 10/2006 | Agesen et al. | 717/120 |
| 2002/0103811 | A1 | 8/2002 | Fankhauser et al. | 707/104.1 |
| 2003/0217111 | A1 | 11/2003 | McKay | 709/207 |
| 2003/0217131 | A1 | 11/2003 | Hodge et al. | 709/223 |
| 2004/0163087 | A1 | 8/2004 | Sandland et al. | 719/310 |
| 2005/0039180 | A1 | 2/2005 | Fultheim et al. | 718/1 |
| 2005/0198488 | A1 | 9/2005 | Sandland et al. | 713/150 |
| 2005/0257206 | A1 | 11/2005 | Semerdzhiev | 717/168 |
| 2006/0041761 | A1 | 2/2006 | Neumann et al. | 713/189 |
| 2007/0079307 | A1 | 4/2007 | Dhawan et al. | 718/1 |
| 2009/0048978 | A1* | 2/2009 | Ginter et al. | 705/51 |
| 2009/0210347 | A1* | 8/2009 | Sarcanin | 705/67 |

FOREIGN PATENT DOCUMENTS

| | | |
|---|---|---|
| GB | 2 387 254 A | 10/2003 |
| JP | 2006079446 | 3/2006 |
| KR | 2005 0005317 | 1/2005 |
| WO | WO 01/96990 A2 | 12/2001 |

OTHER PUBLICATIONS

"Providing Windows Applications to Users: Nine Different Theories and Architectures," http://www.brianmadden.com/printable.asp?id=566 Mar. 14, 2006, pp. 1-6.

"Active Directory" Active Directory—Wikipedia, the free encyclopedia, http://www.en.wikipedia.org/wiki/Active_Directory Jun. 8, 2006, pp. 1-5.

"Symantec Ghost Solution Suite" Ghost Solution Suite: Product Overview—Symantec Corp http://www.symantec.com/Products/enterprise?c=prodinfo&refld=865&print=Y, Not later than Jun. 9, 2006, p. 1 of 1.

"Symantec Ghost Solution Suite" Data Sheet Systems Administration, May 2006, pp. 1-4.

"Symantec Ghost" Symantec, 2004, pp. 1-6.

"Achieving Endpoint Security With VMware ACE" VMWARE, 2006, pp. 1-2.

"Providing Secure, Managed Endpoints on Unmanaged PCs" VMware Secured Managed Endpoint http://www.vmware.com/solutions/desktop/endpoint/html 2006, pp. 1-2.

"Support Hosted Virtual Desktops" Softricity http://www.softricity.com/solutions/virtual-desktops.asp 2006, pp. 1-4.

"What is Virtualization?" VMware Virtualization http://www.vmware.com/virtualization/ 2006, pp. 1-2.

"Virtualization Overview" VMware—White Paper, 2006, pp. 1-11.

"VMware Infrastructure Architecture Overview"—VMware—White Paper, 2006, pp. 1-14.

"Virtualization: Architectural Considerations and Other Evaluation Criteria"—VMware—White Paper, 2005, pp. 1-14.

"Configuring a Primary Desktop Environment" VMware Technical Note, 2005, pp. 1-16.

"Best Practices for Setting Up VMware ACE" VMware Technical Note, 2005, pp. 1-16.

"Implications of Virtualization for Image Deployment" Power Solutions, Oct. 2004, pp. 102-104.

"VMware Takes Virtual Machines Mobil" eWeek Enterprise News and Reviews, http://www.eweek.com/print_article2/0,1217,a=135560,00.asp Sep. 20, 2004, pp. 1-2.

"VMWare ACE—A Method to Distribute Virtual Machines" TechWorld, http://www.techworld.com/reviews/index.cfm?reviewID=332&printerfriendly=1 Sep. 22, 2005, pp. 1-2.

"Better Server Virtualization with Intel Architecture" Intel Virtualization Technology http://www.intel.com/business/bss/products/server/virtualization/htm, 2006, pp. 1-3.

"Stream Desktop Applications" Citrix Systems, http://www.citrix.com/English/ps2/technology/feature.asp?contentID=22714, Not later than Jun. 6, 2006, p. 1 of 1.

"GINA" Wikipedia, the free encyclopedia, http://www.en.wikipedia.org/wiki.GINA May 3, 2006, pp. 1-2.

"Customizing GINA, Part 1" by Keith Brown, MSDN Magazine, May 2005 http://msdn.microsoft.com/msdnmag/issues/05/05/SecurityBriefs/default/aspx?print=true pp. 1-8.

"Customizing GINA, Part 2" by Keith Brown, MSDN Magazine, Jun. 2005 http://msdn.microsoft.com/msdnmag/issues/05/06/SecurityBriefs/default/aspx?print=true pp. 1-8.

"Specify a Replacement GINA Authentication DLL" WinGuides.com, http://www.winguides.com/registry/display.php/945/ Apr. 3, 2002, p. 1 of 1.

"GINA Chaining with the MetaFrame Password Manager Agent," Citrix.com, http://support.citrix.com/article/CTX103185&printable=true Sep. 28, 2004, pp. 1-2.

"RSA SecurID 6.0 Agent Replaces the Standard Windows GINA," Citrix.com, http://support.citrix.com/article/CTX107408&printable=true May 16, 2006, p. 1 of 1.

"Windows Login," Raak Technologies, http://www.raaktechnologies.com/solutions/windows_login.html, Not later than May 31, 2006, pp. 1-3.

"The System Preparation Tool (Sysprep) in Windows XP: an Overview," Killian's Guide http://66.102.7.104/search?q=cache:vBw-crltpTgJ:www.geocites.com/kilian0072002/sys . . . Feb. 28, 2005, pp. 1-22.

"Windows XP: Automating Deployment Using Sysprep," myITforum.com, http://www.myitforum.com/articles/15/print_view.asp?id-4392 Mar. 31, 2003, pp. 1-8.

"Full Version: Use Sysprep.exe Tool to Automate an Install of XP," 4peeps.com Forums, http://4peeps.com/ivb/lofiversion/index.php/t2638.html Jan. 15, 2003, pp. 1-3.

"Using Imaging to Deploy Microsoft Windows Server 2003," Power Solutions, Nov. 2003, pp. 84-87.

"Using SYSPREP to Create XP Pro Images," UEA, http://www.uea.ac.uk/itcs/software/xp/xp-sysprep.html Aug. 11, 2001, pp. 1-5.

"How to Use the Sysprep Tool to Automate Successful Deployment of Windows XP," http://support.microsoft.com/default.aspx?scid=kb;en-us;302577 Apr. 14, 2005, pp. 1-5.

"How to Use Sysprep: An Introduction," Microsoft TechNet, http://www.microsoft.com/technet/prodtechnol/winxppro/deploy/introduction/mspx?pf=true Nov. 29, 2001, pp. 1-2.

"How to Use Sysprep in Factory Mode," Microsoft TechNet, http://www.microsoft.com/technet/prodtechnol/winxppro/deploy/factorymode.mspx?pf=true Nov. 29, 2001, pp. 1-3.

How to Use Sysprep to Automate Mini-Setup, Microsoft TechNet, http://www.microsoft.com/technet/prodtechnol/winxppro/deploy/minisetup.mspx?pf=true Nov. 29, 2001, p. 1 of 1.

How to Use Sysprep to Restore the Computer to an End-User-Ready State, Microsoft TechNet http://www.microsoft.com/technet/prodtechnol/winxppro/deploy/restore.mspx?pf=true Nov. 29, 2001, p. 1 of 1.

"How to Prepare Images for Disk Duplication with Sysprep," Microsoft TechNet, http://www.microsoft.com/technet/prodtechnol/winxppro/deploy/duplication.mspx?pf=true Nov. 29, 2001, pp. 1-2.

"How to Use Sysprep for Auditing Installations," Microsoft TechNet http://www.microsoft.com/technet/prodtechnol/winxppro/deploy/auditing.mspx?pf=true Nov. 29, 2001, p. 1 of 1.

"Kerberos Tickets and How They Work," http://www.upenn.edu/computing/pennkey/use/tktmgr.html, Not later than Jul. 30, 2004, pp. 1-2.

"Kerberos Security in Windows Server 2003,"—Ticket Granting Ticket (TGT) http://www.computerperformance.co.uk/w2k3/Security_Kerberos.html, Not later than Apr. 21, 2006, pp. 1-4.

"Kerberos Building Blocks," http://docs.hp.com/en/T1417-90001/ch01s03.html 2006, pp. 1-6.

"How a Kerberos Logon Works in Windows 2000," Reynolds, Nathan; http://www.serverwatch.com/tutorials/print.php/2176201 Jan. 3, 2001, pp. 1-4.

"VMware ACE—The Assured Computing Environment for the Enterprise," VMware Ace Product DataSheet, pp. 1-2, 2006.

"VMware ACE—The Assured Computing Environment for the Enterprise," Administrator's Manual, (Selected Pages), 2006.

Image: ActiveDirectoryMMC.png, Wikipedia, May 1, 2006.

Keahey, et al., "Contextualization: Providing One-click Virtual Clusters," eScience: 4th IEEE Conference on e-Science, pp. 301-308, Dec. 7-12, 2008.

Bradshaw, et al., "A Scalable Approach to Deploying and Managing Appliances," Proceedings of TeraGrid 2007 Conference, pp. 1-6, Jun. 2007.

Sapuntzakis, et al., "Virtual Appliances in the Collective: A Road to Hassle-Free Computing," Computer Systems Laboratory, Stanford University, pp. 55-60, May 18, 2003.

Brian Madden, "Providing Windows Applications to Users: Nine Different Theories and Architectures," http://www.brianmadden.com/content/article/Providing-Windows-Applications-to-Users-Nine-Different-Theories-and-Architectures, 19 pages, Mar. 14, 2006.

Sugerman, Jeremy, et al., "Virtualizing I/O Devices on VMware Workstation's Hosted Virtual Machine Monitor," In Proceedings of the General Track: 2002 USENIX Annual Technical Conference (Jun. 25-30, 2001), Y. Park, Ed. USENIX Association, Berkeley, CA, pp. 1-14.

Roudebush, Bob, "vThere—A Second Look" RoudyBob.net, [Online] Jul. 31, 2006; Retrieved from Internet: http://www.roudybob.net/?p=307.

Keaney, K., et al., "Virtual Playgrounds: Managing Virtual Resources in the Grind" Parallel and Distributed Processing Symposium, 2006, pp. 1-8.

Lopez, D.R., et al., "Providing Secure Mobile Access to Information Servers with Temporary Certificates" Computer Networks, vol. 31, No. 21, Nov. 10, 1999, pp. 2287-2292.

Kozuch, M., et al., "Internet Suspend/Resume" Fourth IEEE Workshop on Mobile Computing Systems and Applications [Online] Jun. 1, 2002; Retrieved from Internet: www.intel-research.net/publications/Pittsburgh/110620030912_88.pdf.

Figueiredo, R.J. et al., "A Case for Grid Computing on Virtual Machines" Proceedings of the 23rd International Conference on Distributed Computing Systems, vol. 23, May 19, 2003, pp. 550-559.

Ming, Zhao, et al., "Distributed File System Support for Virtual Machines in Grid Computing" High Performance Distributed Computing, Jun. 4, 2004, pp. 202-211.

Bressoud, T., et al., "Seamless Mobile Computing on Fixed Infrastructure" Computer, IEEE Service Center, vol. 37, No. 7, Jul. 2004, pp. 65-72.

Dongyan, Xu, et al., "Virtual Distributed Environments in a Shared Infrastructure" Computer, IEEE Service Center, vol. 38, No. 5, May 2005, pp. 63-39.

England, et al., "Virtual Machines for Enterprise Desktop Security" Information Security Technical Report, Dec. 5, 2006, p. 193-202.

Norton, R.L., "Using Virtual Linux Servers" Computer, IEEE Service Center, vol. 35, No. 11, Nov. 2002, pp. 106-107.

International Searching Report and Written Opinion, PCT/US2007/069509, Jul. 4, 2008.

* cited by examiner

AUGMENTING A VIRTUAL MACHINE HOSTING ENVIRONMENT FROM WITHIN A VIRTUAL MACHINE

CROSS REFERENCE TO RELATED APPLICATIONS

This application claims the benefit of U.S. Provisional Patent Application No. 60/910,288, filed Apr. 5, 2007, titled "Augmenting a Virtual Machine Hosting Environment from within a Virtual Machine," the entire contents of which are hereby incorporated by reference herein for all purposes.

TECHNICAL FIELD

The present invention relates to virtual machines used to run multiple instances of one or more operating systems on a host computer and, more particularly, to methods and systems for providing services to extend, upgrade or otherwise change functional behavior, user interfaces or other aspects of the virtual machine and its hosting software from within the virtual machines.

BACKGROUND ART

A number of companies provide software solutions to enable virtualization of multiple operating systems on a single host computer. These software solutions tend to be focused on technical users who have a need to, for example, consolidate a set of enterprise servers onto a single server for better resource utilization. Other software solutions focus on virtualization of operating systems on desktop computers, typically for purposes such as testing, software development or software compatibility. For example, the Parallels Desktop for Mac product from Parallels, Inc., Renton, Wash. 98057 allows users to run Windows XP applications on Apple Mac computers.

A growing field in the virtualization business space is the use of virtualization to provide better desktop management and security for corporate workstations. In addition, this enterprise-oriented desktop virtualization is being used to provide the ability for workers to access fully secured and managed corporate resources on unmanaged computers, such as employees' home computers, by running virtualized corporate workstations on those unmanaged computers.

The use of virtualization to provide corporate access in unmanaged locations is a way of providing remote access to users, building upon the existing virtualization technology. However, there are significant complexities that arise as the technology is integrated into the corporate environment.

It is desirable for administrative users of a corporate desktop virtualization solution, or any other centrally managed virtualization solution, to have the same level of control and same capacity to upgrade and manage the virtual workstations as they have to control, upgrade and manage centrally located enterprise computers. Existing technologies can provide many of the capabilities needed by the administrator. For example, the Systems Management Server product from Microsoft Corporation, Redmond, Wash. can be used to update, install and remove software on a managed virtual corporate workstation.

However, a significant difference exists between the abilities a corporate IT administrator has available when administering a physical corporate workstation and a virtualized corporate workstation. The administrator has physical access to the physical corporate workstation. Upgrades to the computer, such as adding new peripheral devices, adding memory or adding disk space, can be done by physically accessing the workstation. In the case of a virtual workstation, which is being used on an unmanaged computer and which may not be physically located within the enterprise, this is not possible.

A prior art virtual machine hosting environment typically includes a "player" that is executed by a host computer under control of a host operating system. The player creates a virtual machine that is separate from, and does not execute under, the host operating system. The virtual machine emulates a computer, which can execute an operating system and application programs. Software executed by the virtual machine may establish a virtual private network (VPN) connection with a corporate network and then access resources on the corporate network via the VPN. A corporate network administrator manages the virtual machine, such as by installing required software on the virtual machine. However, in the prior art, the corporate network administrator does not manage, and cannot control or update, the host computer or software thereon.

SUMMARY OF THE INVENTION

An embodiment of the present invention provides a technology extension in a virtual environment that allows software, which may be managed by a corporate IT administrators, to have secured access to update, extend or otherwise change the behavior of software that is running on an unmanaged host computer, which is associated with or is providing a virtualized environment within which the managed virtual corporate workstation is running.

Embodiments of the present invention provide systems and methods for augmenting a virtual machine (computer) hosting environment from within a virtual machine. Some embodiments use a communication channel between the virtual machine and the player to send instructions to the player to load and execute requested software modules. Requests (or messages) to load and execute the modules may originate in a corporate network (such as by a second computer of that network) and may be issued by a corporate network administrator. If a requested module is not stored on the host computer, the virtual machine may upload the module, via the communication channel, to the player. The uploaded module may, for example: (a) install a required upgrade in the host operating system; (b) execute virus checking software on the host computer; or (c) install a corporate network-provided secure printing module that enables software being executed by the host computer to print on devices connected to the host computer.

An embodiment of the current invention includes a software solution providing the ability for software running within a virtual environment to update, extend or otherwise change the operating parameters or environment the virtual computer is running within. This embodiment includes providing a secured communication mechanism for software running in the virtual computer to access a limited set of services running on the physical computer. The embodiment additionally provides mechanisms to publish software components ("Extension Modules") to the host computer through this communication mechanism. The embodiment additionally provides a secured environment that the Extension Module will be executed within on the host computer. The embodiment additionally provides mechanisms including, but not limited to, Application Programming Interfaces for the Extension Modules to access additional resources, such as configuration options, other software or physical devices, on the host computer.

Extension Modules can perform services including, but not limited to, changing configuration information, extending the behavior of the hosting application in response to predetermined events, updating portions of or the entire hosting environment, providing extended scanning of the host computer for security threats, and adding new functionality to the hosting environment. An embodiment of an extension module provides new services, such as providing for software within the virtual computer to securely print to printers attached to the host computer.

An embodiment of the present invention provides a method for loading software on a host computer that hosts a virtual machine. A request is sent from within the virtual machine to a hosting application being executed by the host computer. The request is a request to load requested software. In response, the hosting application loads the requested software onto the host computer.

If the requested software is not installed on the host computer, the requested software may be uploaded from the virtual machine to the host computer, and then the uploaded software may be installed on the host computer. Optionally or alternatively, the requested software may be downloaded from a server to the host computer and then installed on the host computer.

Sending the request to the hosting application may include uploading a software module from a server to the virtual machine via a virtual private network connection established between the server and the virtual machine and then executing the uploaded software module by the virtual machine.

Loading the requested software onto the host computer may include executing at least part of the loaded software by the host computer, storing at least part of the loaded software on a storage device attached to the host computer and/or storing at least part of the loaded software on a storage device attached to the host computer. Loading the requested software onto the host computer may include modifying existing software on the host computer, augmenting existing software on the host computer and/or replacing, at least in part, existing software on the host computer.

Loading the requested software onto the host computer may include any or all of the following: installing an upgrade in the host operating system; executing virus checking software on the host computer; and/or installing a secure printing module.

Another embodiment of the present invention provides a computer program product for use on a computer system for loading software on a host computer that hosts a virtual machine. The computer program product includes a computer-readable medium on which are stored computer instructions for execution by a processor. When executed, the instructions cause the processor to send a request from within the virtual machine to a hosting application being executed by the host computer. The request may be a request to load requested software. The instructions also cause the processor to load onto the host computer the requested software by the hosting application.

If the requested software is not installed on the host computer, the instructions cause the processor to upload the requested software from the virtual machine to the host computer and then install the uploaded software on the host computer. Optionally or alternatively, if the requested software is not installed on the host computer, the instructions cause the processor to download the requested software from a server to the host computer and then install the downloaded software on the host computer.

The instructions that cause the processor to send the request to the hosting application may include instructions to upload a software module from an enterprise to the virtual machine via a virtual private network connection established between the enterprise and the virtual machine and to execute the uploaded software module by the virtual machine. The instructions that cause the processor to load the requested software onto the host computer may include instructions to execute at least part of the loaded software by the host computer, store at least part of the loaded software on a storage device attached to the host computer and/or store at least part of the loaded software in a memory used to store instructions that are executed by the host computer.

The instructions that cause the processor to load the requested software onto the host computer may include instructions to modify existing software on the host computer, to augment existing software on the host computer and/or to replace, at least in part, existing software on the host computer.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Figure 1:
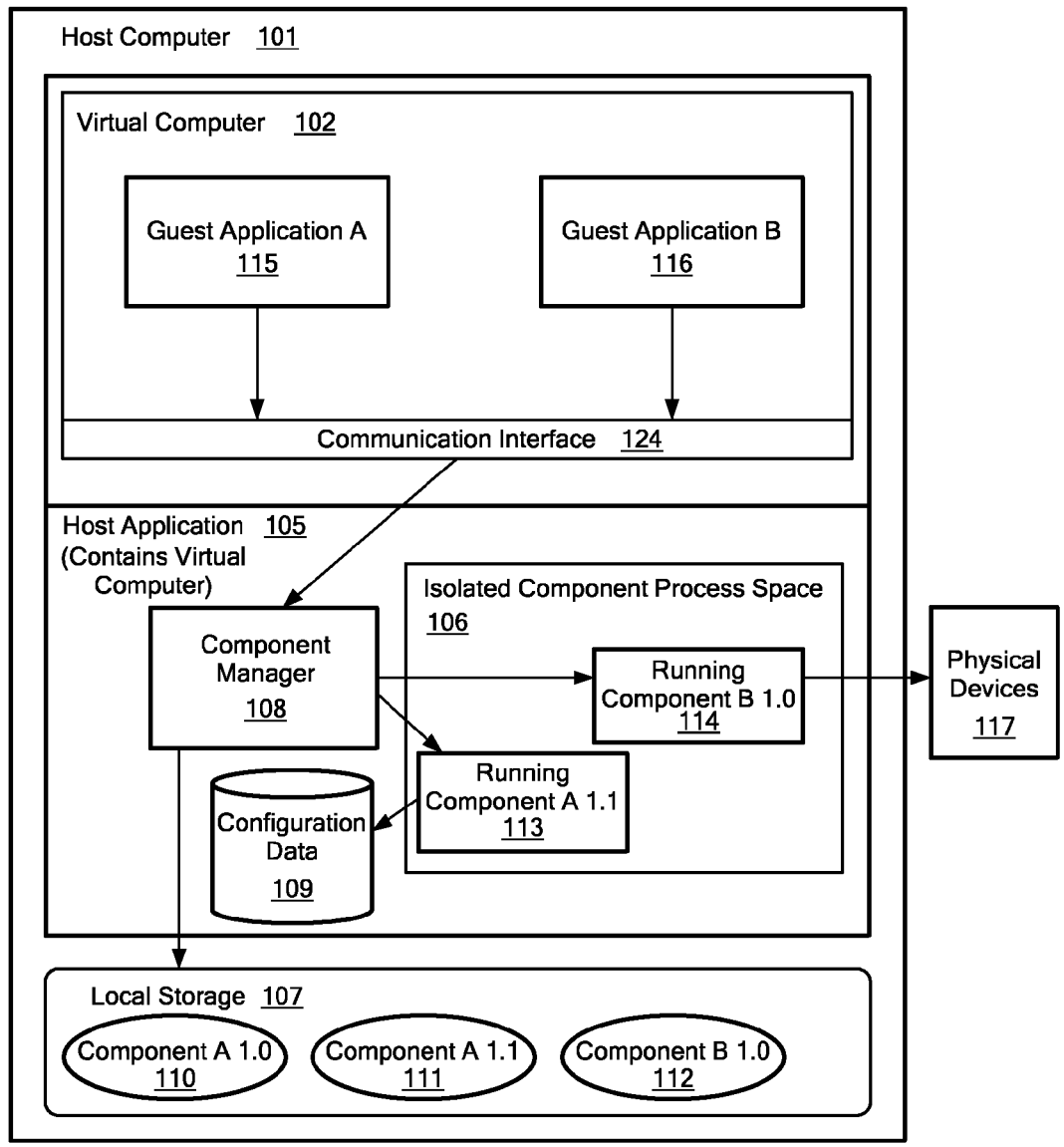
FIG. 1 is a schematic block diagram of components involved in controlling at least part of an environment of a host computer from within a virtual machine, when used in a player hosting application, in accordance with an embodiment of the invention.

The contents of U.S. Provisional Patent Application No. 60/910,288, filed Apr. 5, 2007, titled "Augmenting a Virtual Machine Hosting Environment from within a Virtual Machine," U.S. Provisional Patent Application No. 60/839,157, filed Aug. 22, 2006, titled "Remote Network Access Via Virtual Machine," U.S. Provisional Patent Application No. 60/816,288, filed Jun. 23, 2006, titled "Remote Network Access Via Virtual Machine," U.S. patent application Ser. No. 11/689,177, filed Mar. 21, 2007, titled "Remote Network Access via Virtual Machine" and U.S. patent application Ser. No. 11/689,190, filed Mar. 21, 2007, titled "Accessing a Printer Resource Provided by a Real Computer from within a Virtual Machine" are all hereby incorporated by reference herein for all purposes.

DEFINITIONS

As used in this description and the accompanying claims, the following terms shall have the meanings indicated, unless the context otherwise requires:

A "Virtual Machine" (sometimes herein called a "VM") is a self-contained software environment on a host computer that simulates a computer separate from the host computer, providing at least a degree of system independence from the hardware and software environment of the host computer, including from the operating system of the host computer.

A "Virtual Machine Image" (sometimes herein called a "VM Image" or an "Image") is a specific instance of a Virtual Machine.

A "Hosting Application" (sometimes herein called a "Hosting Environment") is an application that manages a "Virtual Machine."

A "VIC" is an application or process that allows for the authoring of "Virtual Machines" and is a certain type of "Hosting Environment."

A "Player" is an application or process that runs a "Virtual Machine" and is a type of "Hosting Environment."

A "Guest Process" is an application or process that runs inside a "Virtual Machine."

An "Extension Module" (sometimes herein called a "Module") is a software component that is managed by a "Guest Process" and whose purpose is to be installed into a secured portion of a "Hosting Environment" to extend, limit, upgrade, configure or take any other action upon the Hosting Environment or Host Computer.

A "UI Module" is a specific embodiment of an Extension Module whose purpose is to extend, limit or otherwise change a visual element that an end user interacts with while using a "Player" or "VIC." Examples include: a menu item, configuration dialog, or any other user interface (UI) element used by an end user.

A "Communication Module" is a specific embodiment of an Extension Module whose purpose is to extend a set of functionality available to a Guest Process for communication with a Hosting Environment.

An "Upgrade Module" is a specific embodiment of an Extension Module whose purpose is to enable a partial or wholesale updating of a hosting environment or other software on a Host Computer.

A "Configuration Setting" is a controlling parameter used to affect how a "Player" or "VIC" functions. A non-limiting example of a configuration setting is a parameter that controls how software running within a Virtual Machine connects to a remote network via a Virtual Private Network.

Virtual Machine

Figures 10, 11:
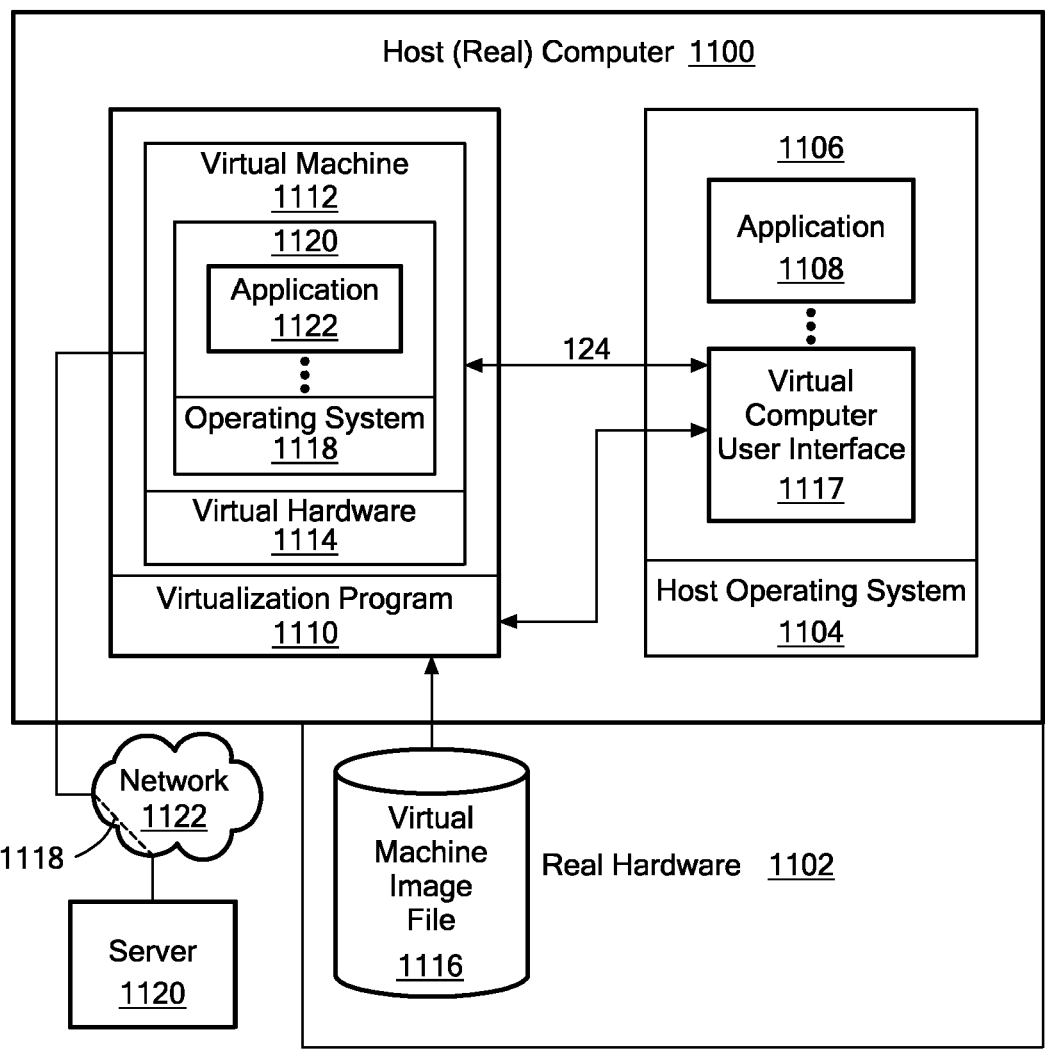
FIG. 10 depicts an exemplary user interface to the installation of a functional component as described in FIG. 6, in accordance with an embodiment of the present invention.
FIG. 11 is a schematic block diagram of a virtual machine operating within a real computer, according to an embodiment of the present invention.

A virtual machine simulates actual computer hardware. FIG. 11 is schematic block diagram of a virtual machine operating within a real computer, an environment in which embodiments of the present invention may be used. A host computer 1100, such as a personal computer, includes real hardware 1102, such as a basic input/output system (BIOS), one or more central processing units (CPUs), memory, one or more disk drives and, optionally, other peripheral devices. The host computer 1100 executes a host operating system 1104, such as the Windows XP operating system available from Microsoft Corporation, Redmond, Wash. Alternatively, other operating systems, such as Linux, can be used. The host operating system controls the real hardware 1102 and provides an environment 1106 in which one or more application programs, such as application 1108, can execute. The host operating system provides an interface between the application 1108 and the real hardware 1102. If the host computer 1100 is appropriately equipped, such as with a network interface card (NIC), the host operating system can establish a network connection to another computer.

A "virtualization program" 1110 (sometimes referred to as a virtual machine manager, virtual machine monitor, or VMM) is a program that executes on the host (real) computer 1100, typically independently of the host operating system 1104. The virtualization program creates an environment 1112, a "virtual machine" 1112 (defined above), in which other software can be executed. The virtualization program 1110 simulates operation of a computer. For example, the virtualization program 1110 provides virtual hardware 1114, including a BIOS, CPU(s), memory, disk drive(s) and optionally other peripherals to software that executes on the virtual machine 1112.

The configuration of the virtual machine 1112, such as the CPU model, amount of memory, initial contents of the memory, number of disk drives and their contents, are stored in a virtual machine image file 1116. Upon beginning execution, the virtualization program 1110 reads the virtual machine image file 1116 and creates the virtual machine 1112 according to information in the virtual machine image file 1116. Exemplary virtualization programs 1110 are available from VMware, Inc., Palo Alto, Calif.; Parallels, Inc., Herndon, Va.; and Microsoft, Corporation, Redmond, Wash.

The virtualization program 1110 may provide a virtual machine user interface 1117 (also referred to as a "player"), which executes as an application in the environment 1106 created by the host operating system 1104. The virtual machine user interface 1117 typically communicates with the virtualization program 1110, such as to specify which virtual machine image file 1116 the virtualization program 1110 is to use to create the virtual machine 1112. Once the virtual machine 1112 is created, the virtual machine user interface 1117 displays a window which displays outputs from the virtual machine 1112 and accepts user inputs for the virtual machine 1112.

The virtual machine 1112 typically executes software just as a real computer executes software. For example, the virtual machine 1112 typically executes an operating system 1118. The operating system 1118 executed by the virtual machine 1112 need not be the same operating system or version as the host operating system 1104 executed by the host computer 1100. The operating system 1118 executed by the virtual machine 1112 creates an environment 1120 in which one or more application programs, such as application 1122, can execute.

The virtualization program 1110 simulates interactions between the software, such as the operating system 1118 and the applications 1122, that executes on the virtual machine 1112 and the virtualized hardware 1114, such as disk drives and network interface cards (NICs). Thus, the software executed by the virtual machine 1112 has a degree of isolation from software executed by the host computer 1100.

Augmenting Virtual Machine Hosting Environment from within a Virtual Machine In some circumstances, particular software or a particular version of software is required to be executed by a host computer, such as to support software being executed by a virtual machine. For example, as described in U.S. patent application Ser. No. 11/689,190, software being executed by a virtual machine may need to print a document on a printer that is accessible by a host computer, such as on a locally attached printer or on a network attached printer. Support software on the host computer receives and processes print requests sent from the virtual machine. However, according to the prior art, the host computer may not be managed by an enterprise IT organization, thus the IT organization may not have a mechanism for installing and maintaining the required software on the host computer.

As described in the above-referenced U.S. patent application, and with continued reference to FIG. 11, before creating the virtual machine, a player opens a listening port. Software being executed by the virtual machine opens a connection 124 to the player's listening port, and the software on the virtual machine and the player can thereafter communicate with each other via the connection 124.

Software being executed by the virtual machine may request the player to load required software or a particular version of software on the host computer or to verify that the required software or version of the software is already loaded on the host computer. The software on the virtual machine sends such a request via the connection 124 to the player, and, in response, the player performs the requested action. The player then sends a reply to the software on the virtual machine to indicate a status of the request. The status may indicate whether the request was successful or not, such as whether the requested software was loaded on the host computer or the software is not installed on the host computer and, therefore, not available for loading.

The software being executed by the virtual machine may upload software to the player via the connection 124. For example, if a request to load a particular software module on the host computer fails, such as because the requested module is not installed on the host computer, the software on the virtual computer may then upload the requested software to the player and request the player to install and load the software on the host computer.

The uploaded software may be new software, i.e., software that has not previously been installed on the host computer, or an upgrade to existing software, i.e., a new version of software that was previously installed on the host computer. The uploaded software may be one or more complete software modules, "patches" to existing modules, configuration or other data files or any other file or data that may be transmitted via the connection 124. The uploaded software may include instructions to the player regarding how the remainder of the uploaded software is to be processed. For example, these instructions may identify existing software or versions of software that are to be augmented or modified, using one or more uploaded components.

The player may execute the uploaded software, store the uploaded software or use the uploaded software to augment or otherwise modify the player or other software on the host computer. The player may perform one or more of these tasks immediately, at a later time or a combination thereof. Modifying the player or other software, including all or part of the operating system being executed by the host computer (collectively the "software being modified") includes: adding all or a portion of the uploaded software to the software being modified ("augmenting the software being modified") or replacing all or a portion of the software being modified. The uploaded software may include an executable module, and the player may spawn a process in which the uploaded module executes. The executing module may then modify the player or other software, independently or semi-independently of the player.

A virtual machine is created, operated and shut down in steps. Exemplary steps include: starting execution of the player; starting execution of a virtual machine image; ending execution of a virtual machine image; and ending execution of the player. Other, more finely-resolved steps may be used. An event module in the virtualization program 110 keeps track of these steps. Uploaded software may be processed at one or more of these steps. For example, software on the virtual machine may upload a spyware detection program to a player and request that the spyware detection program be executed by the host computer before a particular (or any) virtual machine image is used to start a virtual machine.

As noted, software being executed by a virtual machine may request a player to load requested software on a host computer. This is referred to as "demand-loading," because the request is made while the virtual machine software is being executed. The requested software is loaded when the request is made. If the virtual machine software does not make such a request, the player does not load the software.

On the other hand, software or a version of software may be required on a host computer before a virtual machine is started, or it may be desirable to pre-load the software before the virtual machine is started for performance or other reasons. When a virtual machine image file is created, the image file may be marked as requiring the software or version of the software. This is referred to as "registering" the required software with the image file. Whenever a hosting application processes an image file, if the image file lists registered software or versions of software, the hosting application loads the registered software before starting the virtual machine.

If the registered software is not installed on the host computer, the hosting application may download the registered software, such as from a server 1124 to which the host computer is connected via a network 1126. The network may be a private network, such as a local-area network or a private wide-area network. The network may be a public network, such as the Internet. In one embodiment, the hosting application downloads the registered software from a server on the Internet. Once the registered software is downloaded from the server, the hosting application may load the registered software, as described above.

As described in the above-referenced patent applications, a virtual private network (VPN) connection may be established between a virtual machine and an enterprise network. The enterprise's IT organization may manage the virtual machine via the VPN connection, including installing and upgrading software on the virtual machine. According to the present invention, the IT organization may upload software to the virtual machine from the enterprise, and the uploaded software may, in turn, augment, modify or replace software on the host computer, as described above. Thus, the IT organization may effectively control at least part of the environment provided by the host computer, without directly managing the host computer.

The following sections describe demand-loading and registering software in various contexts. FIG. 1 is a schematic block diagram of components involved in controlling at least part of an environment of a host computer 101 from within a virtual machine 102, when used in a player hosting application 105, according to an embodiment of the present invention. Guest applications, exemplified by guest applications A and B (115 and 116), may be executed by the virtual computer 102.

The player 105 may include a component manager 108, which facilitates loading, modifying, replacing, etc. components on the host computer 101, in response to instructions and/or data from a component being executed by the virtual machine 102, as described in more detail below. A "component" is a software module that may be loaded and executed on demand or as needed. Examples of components include device drivers, application extensions (DLLs), and the like. Components, exemplified by Components A, B and C (110, 111 and 112), may be stored in local storage 107 on the host computer 101.

The player 105 manages an isolated component process space 106, in which components, exemplified by Running Components A and B (113 and 114), may be executed by the host computer 101. The player 105 may load a component, such as from the local storage 107, into the isolated component process space 106 and pass control to the loaded component. The player 105 or a component being executing within the isolated component space 106 may access configuration data 109 stored on the host computer 101. As shown, a component being executed within the isolated process space 106, such as Running Component B 114, may communicate with and/or control physical devices, exemplified by physical device 117, connected to the host computer 101. The player 105 and the virtual machine 102 (or software being executed by the virtual machine 102) may communicate via a communication interface 124, as described above.

Figure 2:
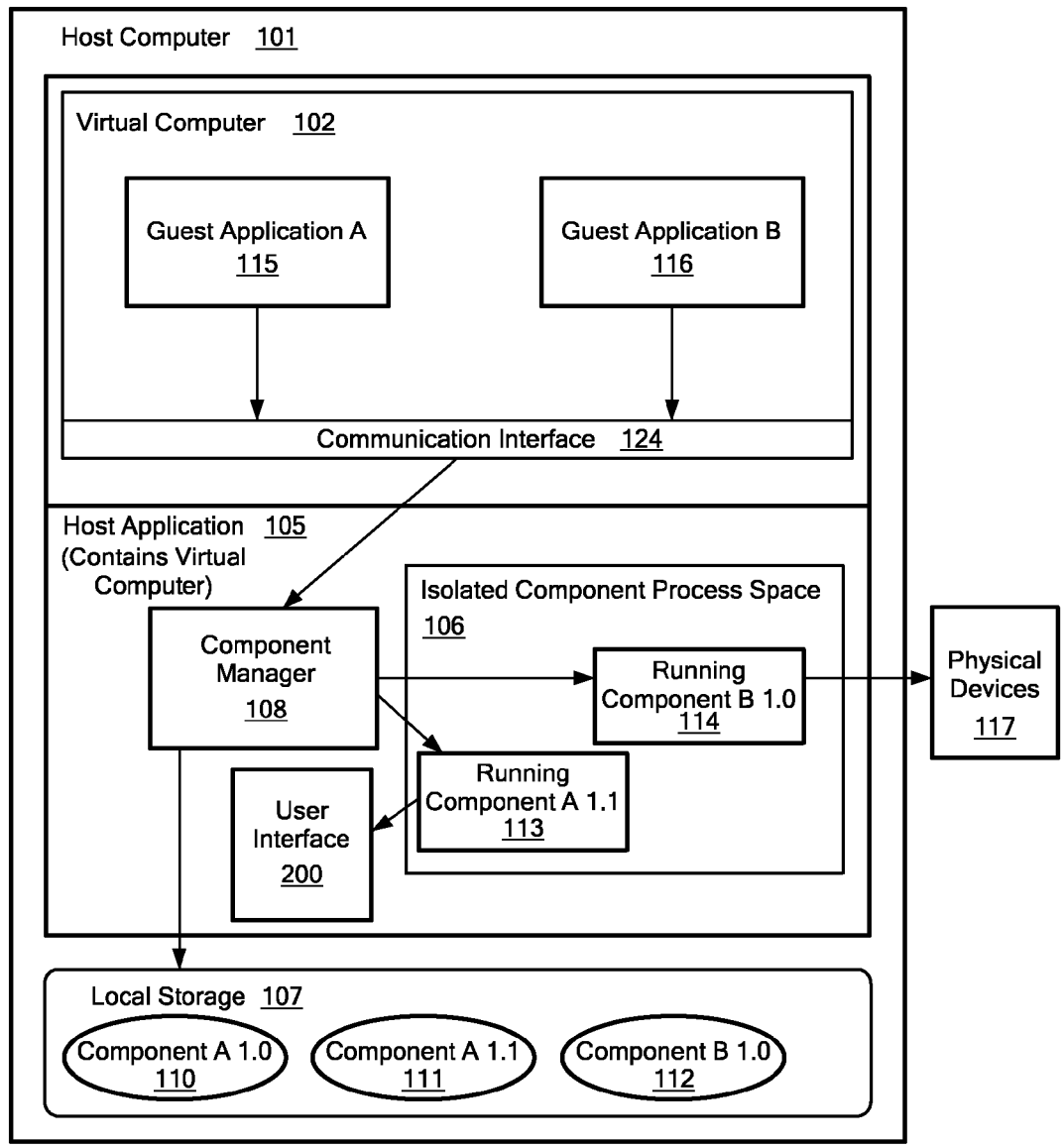
FIG. 2 is a schematic block diagram of components involved in controlling at least part of an environment of a host computer from within a virtual machine, when used in a VIC hosting application, in accordance with an embodiment of the invention.

FIG. 2 is a schematic block diagram of components involved in controlling at least part of an environment of a host computer 101 from within a virtual machine 102, when used in a VIC hosting application, according to another embodiment of the invention. A user interface 200 may be used to display output to, and/or accept input from, a user by a component being executed in the isolated component space 106, as shown.

Adding New UI Component

Figure 3:
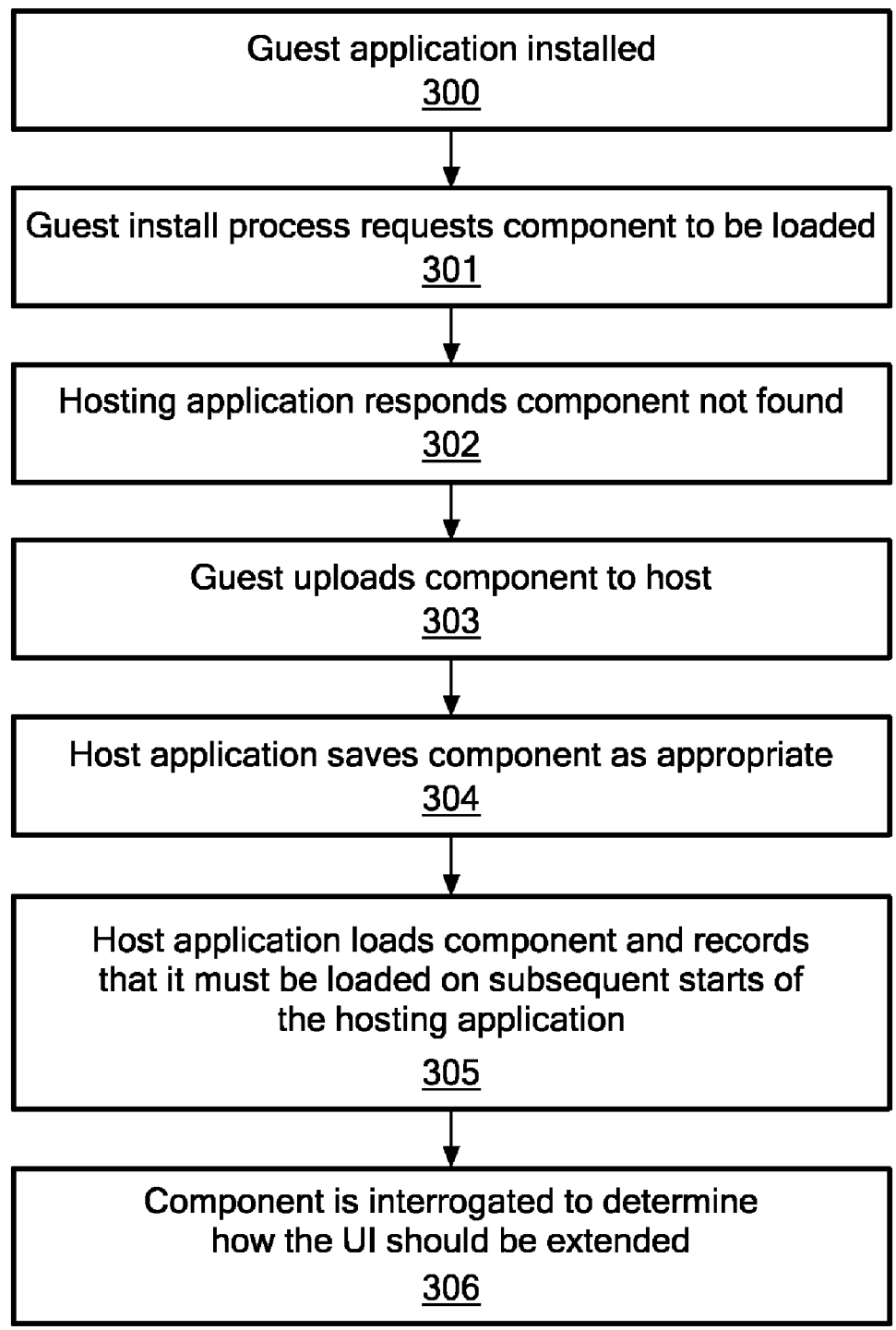
FIG. 3 is a flowchart describing operations related to adding a new user interface component to a virtual machine hosting application, in accordance with an embodiment of the present invention.

FIG. 3 is a flowchart diagram that describes how a guest operating system in a VM adds a new user interface (UI) Module to a hosting application (Player and/or VIC). At 300, the VM starts a guest process, such as a Cisco or Checkpoint Virtual Private Network (VPN) authentication plug-in. Upon the VPN Plug-in being started, at 301, the guest process requests (via the connection 124 (FIG. 11)) a required UI Module to be loaded by the hosting environment. (A system that provides such a connection 124 (FIG. 11) is available under the tradename vThere packaged desktop virtualization system from Sentillion, Inc., Andover, Mass. 01810. The connection provided by the vThere system is referred to as the "vThere secure Guest-Host application conduit.") The hosting application receives the call from the guest application and determines if the requested component exists in the current list of UI Modules. Upon not finding the UI Module, at 302, the hosting application responds with an error that indicates the extension module was not found.

Upon receiving the response from the hosting application, at 303, the guest uploads the UI Module to the hosting environment. Once the upload process is completed via the vThere secure Guest-Host application conduit, at 304, the hosting application saves the UI component. Once the UI component has been saved, at 305, the hosting environment marks the US component as being required upon startup of the hosting application for the current VM Image and to be subsequently restarted on each load or invocation of the VM Image within the hosting application.

Once the hosting application has loaded the UI Module, at 306, the newly uploaded UI Module is interrogated by the hosting application to determine the proper way to display the new UI component. Exemplary UI components include a VPN configuration dialog in the vThere VIC and the vThere Printing progress dialog.

Editing an Existing UI Module

Figure 4:
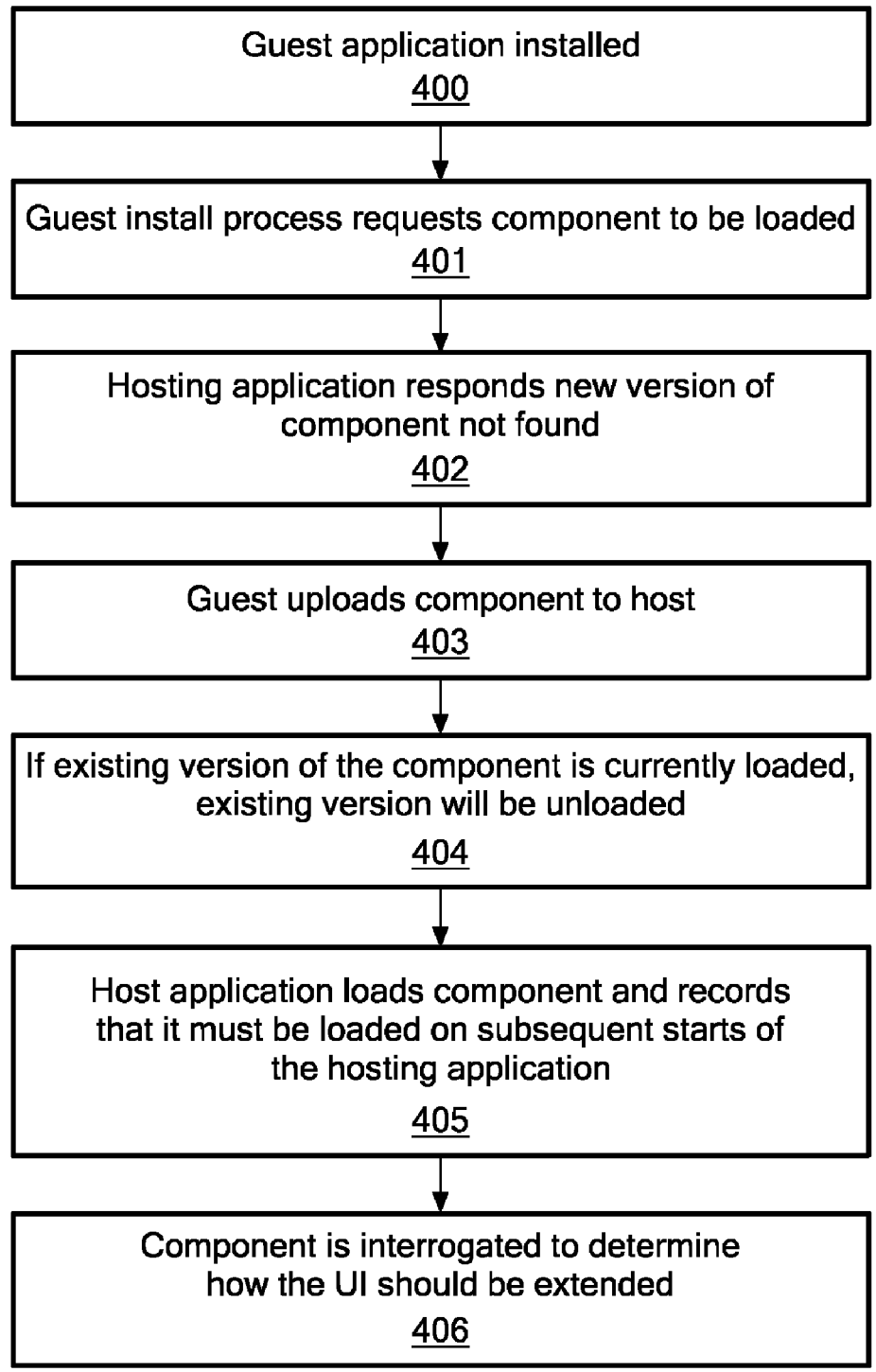
FIG. 4 is a flowchart describing operations related to editing an existing user interface (UI) component, previously installed by the process described in FIG. 3, in accordance with an embodiment of the present invention.

FIG. 4 is a flowchart diagram that describes how a guest VM may edit a UI component that was previously added to the hosting environment (Player and/or VIC). At 400, a guest application, such as an updated VPN Plug-in, is installed into the VM image. Upon the plugin-in installation or execution, at 401, the guest process requests that a certain version of an existing UI Module be loaded. The hosting application receives the call from the guest application and determines if the specified version of UI Module exists in the current list of installed UI Modules.

Upon searching for the certain version of the UI Module 401, if the hosting environment fails to find the requested version, at 402, the hosting environment responds to the guest application, indicating that the specified extension module could not be found. At 403, the guest application then uploads the updated UI Module to the hosting application, as described above, with respect to adding a new UI component.

Once the hosting environment has received the updated UI Module and saved the UI Module, at 404, the existing (presumably incorrect version) UI Module is unloaded. At 405, the hosting application loads and records that the component needs to be loaded on subsequent loads or invocations of the VM Image within the hosting application.

Once the hosting application has loaded the required version of the UI component, at 406, the newly uploaded component is interrogated by the hosting application to determine the proper way to display the new UI component. Exemplary UI components include the VPN configuration dialog version 1.2 in the vThere VIC and the vThere Printing version 1.3 progress dialogs.

Adding a New Extension Module—Demand Loaded

Figure 5:
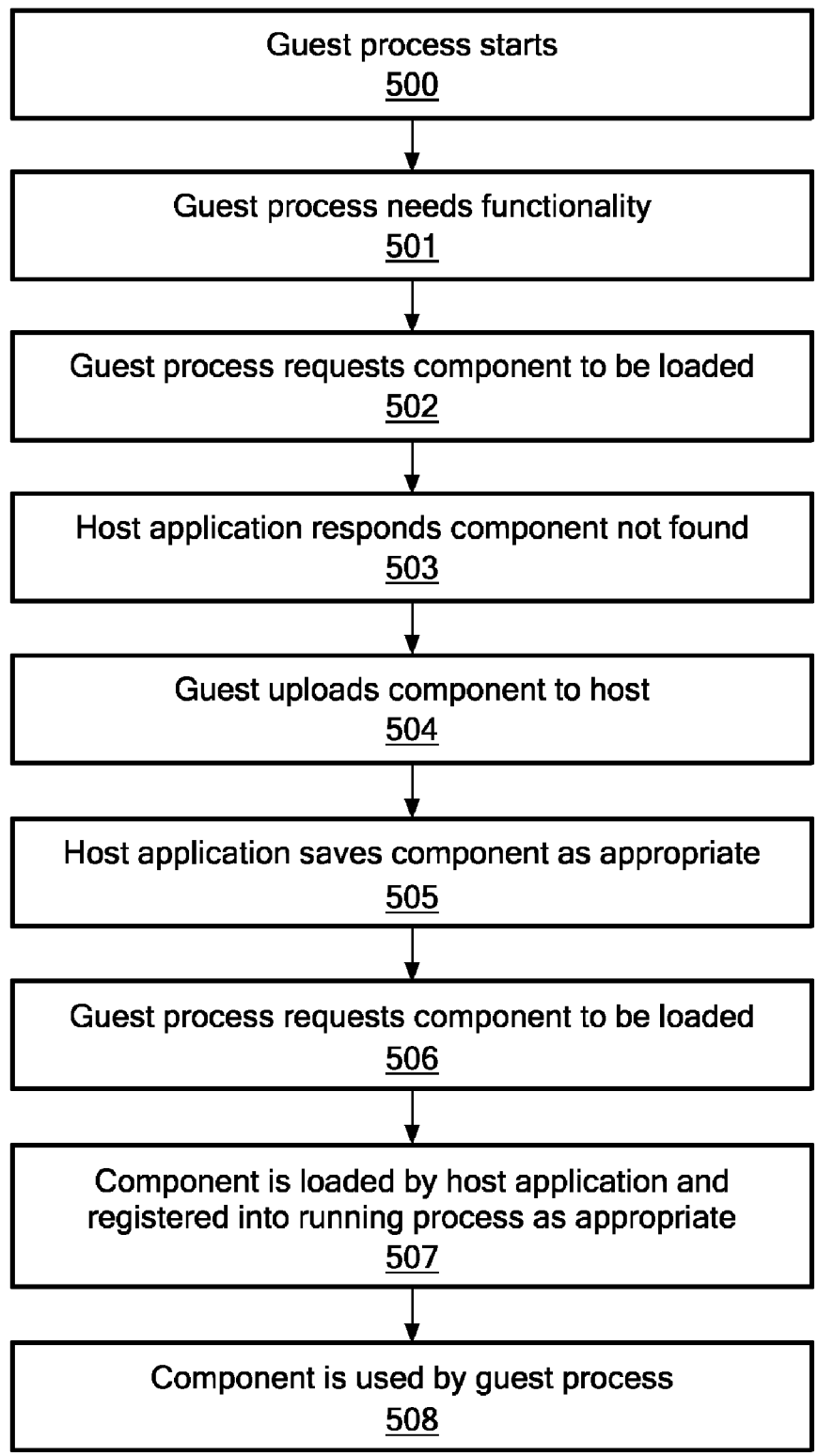
FIG. 5 is a flowchart describing operations related to adding a new functional component that will be demand-loaded, in accordance with an embodiment of the present invention.

FIG. 5 is a flowchart diagram that describes how a guest VM may add a new Communication Module or other Extension Module to a hosting application (Player and/or VIC). At 500, a guest process, such as the vThere Printer, is installed into the VM image. Upon the guest process starting, at 501 the guest process determines if a specific functionality is needed. If so, at 502, the guest process requests that the hosting application demand-load an Extension Module that implements the required functionality.

Once the hosting application receives the request, the hosting application searches in the existing set of Extension Modules, which have been previously installed. Because the request from the Guest process is for a new Extension Module, at 503, the host application responds, indicating that the requested Extension Module could not be found.

When the guest process receives the response from the hosting application, at 504, the guest process begins a secure upload of the component to the hosting application. Upon successfully receiving the uploaded component, at 505, the hosting application saves the new Extension Module.

At 506, the guest process then requests that the newly uploaded Extension Module be loaded into a secured portion of the hosting applications process space. At 507, the hosting application loads the Extension Module and registers the Extension Module into the host's running process. Thereafter, at 508, the guest process can use the new functionality of the Extension Module.

Adding a New Extension Module—Installed

Figure 6:
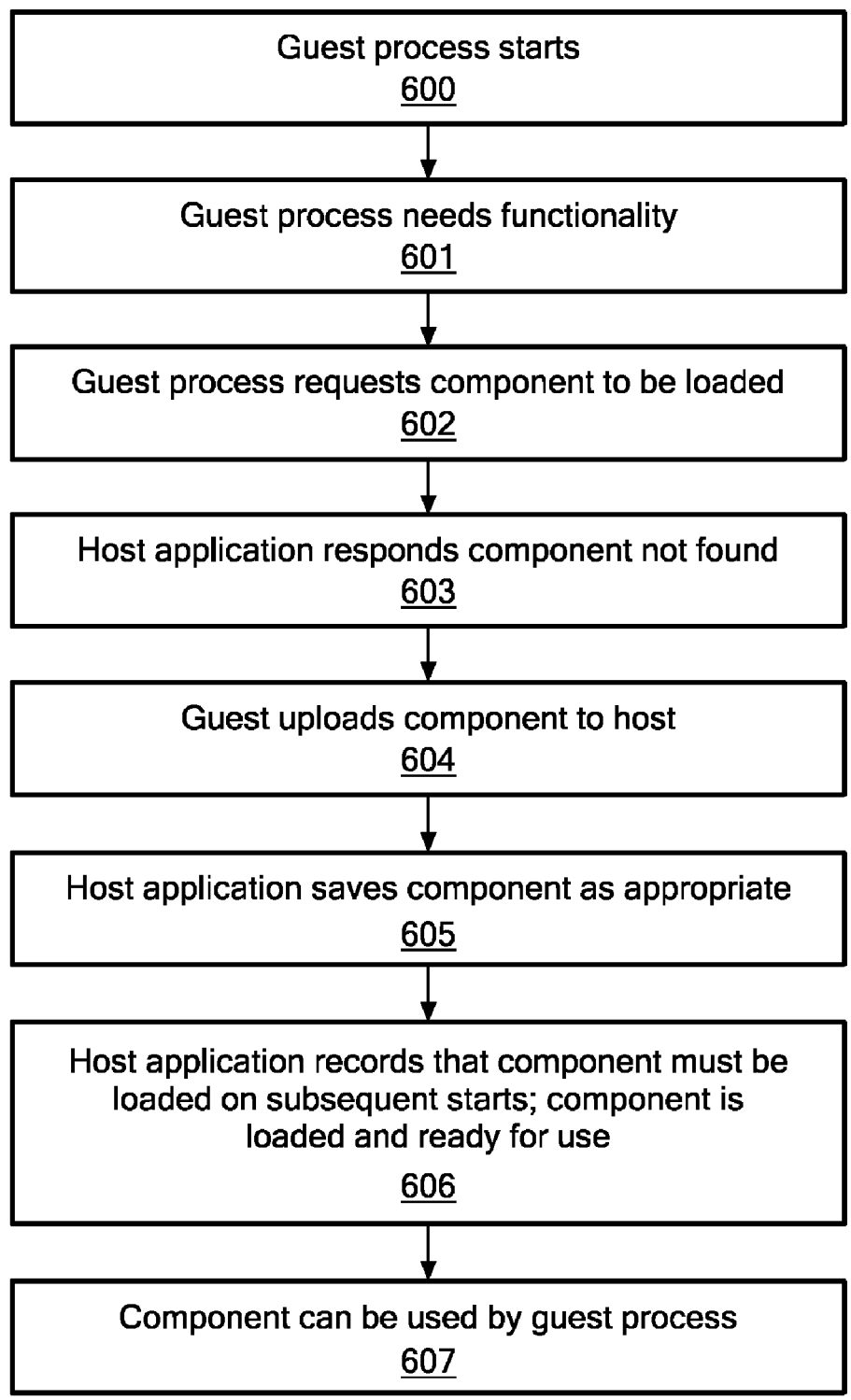
FIG. 6 is a flowchart describing operations related to adding a new functional component that will be loaded without direct guest request, in accordance with an embodiment of the present invention.

FIG. 6 is a flowchart diagram that describes how a new extension module to the hosting application may be installed into the Hosting Environment, in cases where the extensions module is not loaded on demand by a Guest Process within the VM Image (Player and/or VIC) or registered as a UI Extension. Exemplary Extension Modules include, but are not limited to, Modules that add extended activity auditing or Host security tests. At 600, a guest process is installed into the VM image. Upon the guest process starting, at 601, the guess process determines that a new functionality is needed. At 602, the guest process requests the hosting application to load an Extension Module that implements the new functionality.

Once the hosting application receives the request, the hosting application searches in the existing set of Extension Modules. Because the request from the Guest process is for a new functional component, at 603, the host application responds by indicating that the Extension Module requested could not be found.

When the guest process receives the response from the hosting application, at 604, the guest process begins a secure upload of the component to the hosting application. Upon successfully receiving the uploaded component, at 605, the hosting application saves the new Extension Module.

At 606, the hosting application records that the new Extension Module must be loaded on subsequent starts. At 607, the component 604 is loaded and used by a guest process.

Edit an Existing Functional Component

Figure 7:
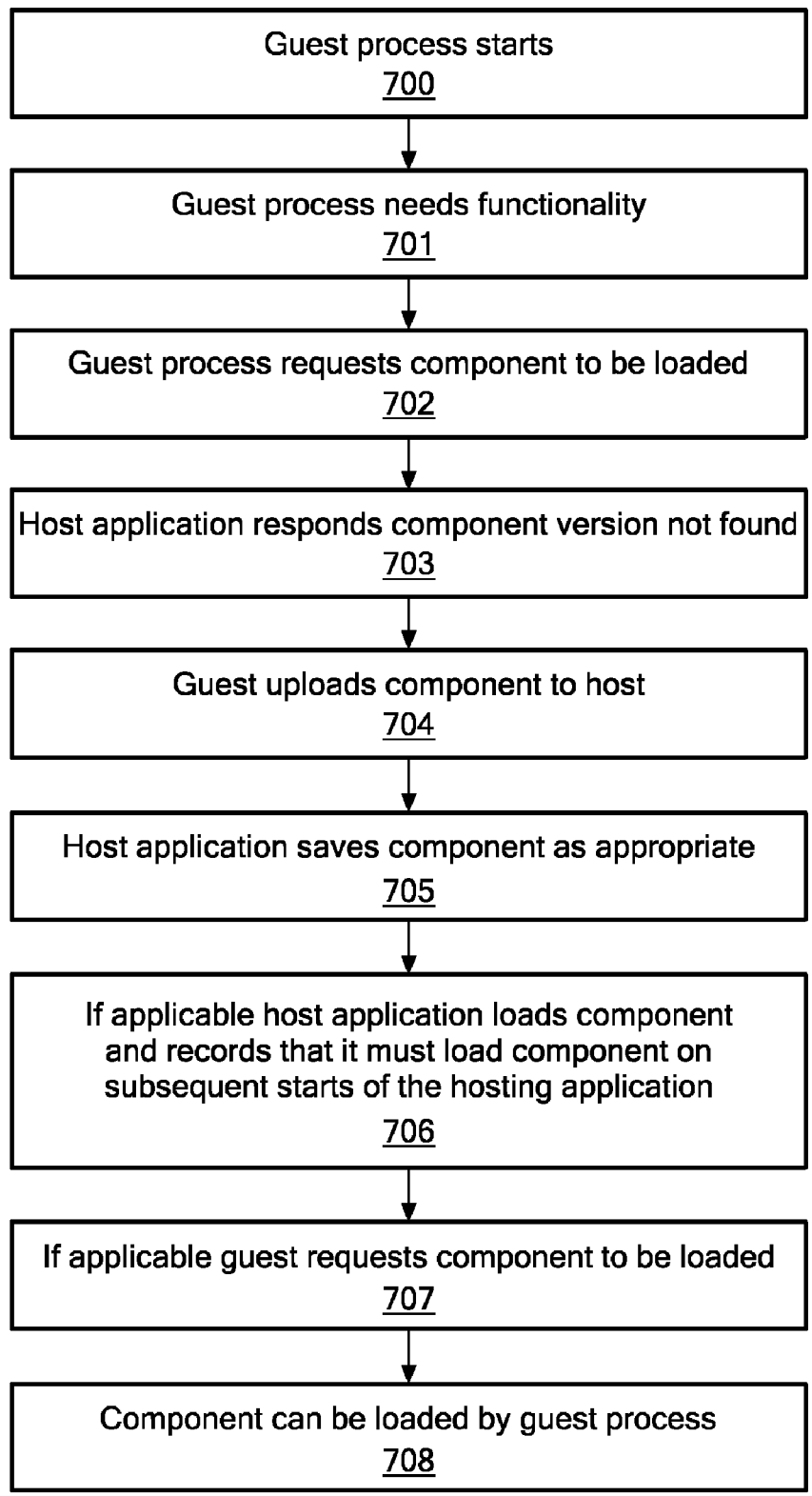
FIG. 7 is a flowchart describing operations related to editing an existing functional component, previously installed by the process described in FIG. 5 or 6, in accordance with an embodiment of the present invention.

FIG. 7 is a flowchart diagram that describes how a guest VM may edit or otherwise modify a previously installed Extension Module in a hosting application (Player and/or VIC). At 700, a guest process is installed or started within the VM image. Upon the guest process starting, at 701, the guess process determines that certain functionality is required. At 702, the guest process requests the hosting application to load the specific version of the Extension Module that implements the required functionality.

Once the hosting application receives the request, the hosting application searches in the existing set of Extension Modules for the requested version of the Extension Module. Since this request from the Guest process is for an Extension Module with a version that doesn't exist on the Host Application, at 703, the host application responds by indicating that the functional Extension Module requested could not be found.

When the guest process receives the response from the hosting application, at 704, the guest process begins a secure upload of the component to the hosting application. Upon successfully receiving the uploaded component, at 705, the hosting application saves the new Extension Module.

If applicable, at 706, the hosting application then records that the new Extension Module should be started on subsequent restarts of the VM Image. If the edited component is to be demand-loaded, at 707, the guest process requests that the Extension Module be loaded. At 708, the Extension Module is ready to process requests from the guest process.

Replace Hosting Environment

Figure 8:
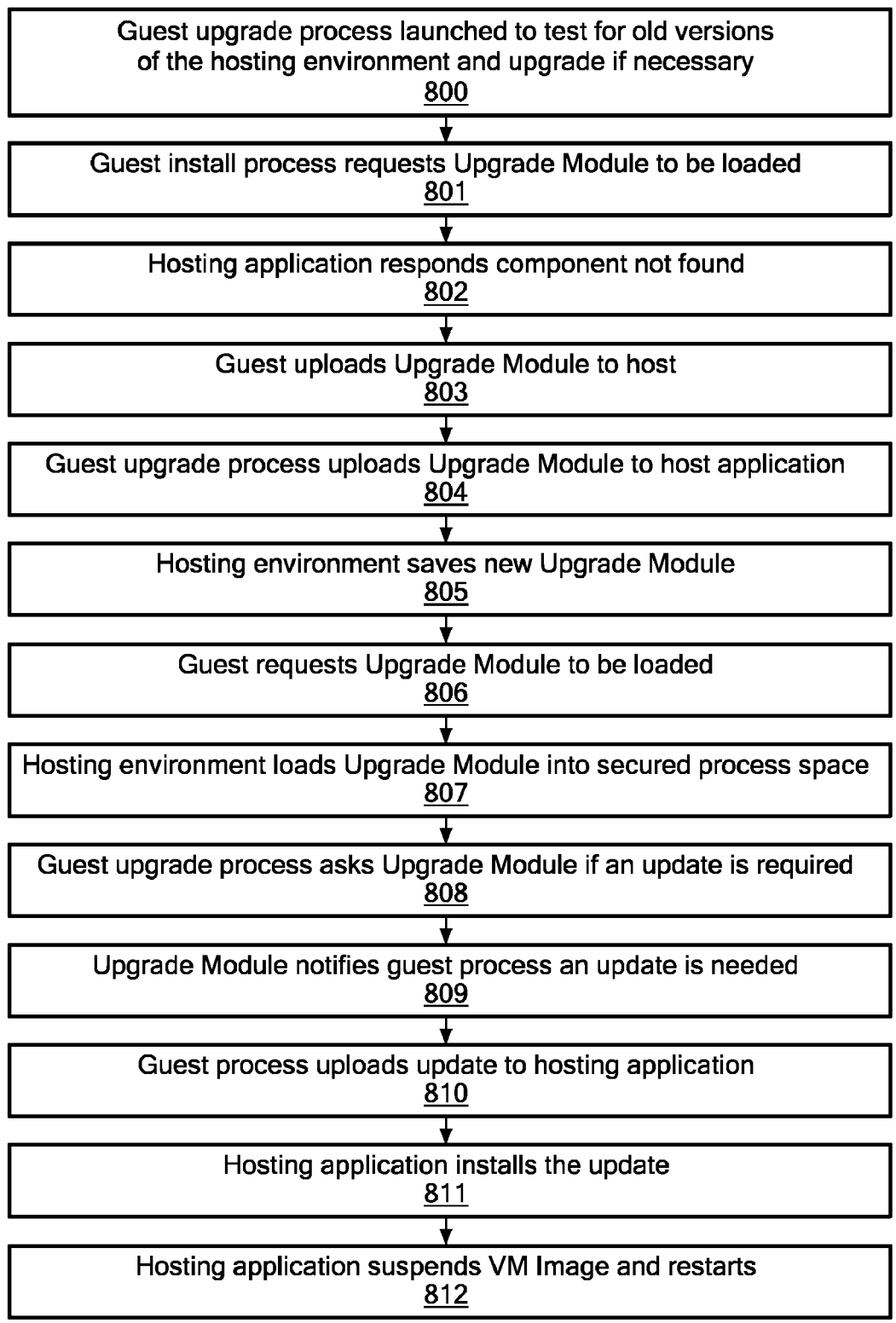
FIG. 8 is a flowchart describing operations related to replacing the hosting environment (either Player, Viewer or both), in accordance with an embodiment of the present invention.

FIG. 8 is a flowchart diagram that describes how a guest VM may initiate replacement of an entire hosting environment (a Player application, VIC application or both). When an update become available, at 800, a guest process is executed within the VM image. Upon the guest process starting, at 801, the guest process requests the hosting application to load the specific Upgrade Module, which handles determining if an upgrade is required.

Once the hosting application receives the request, the hosting application searches the existing set of Extension Modules for the Upgrade Module. Because the request from the Guest process is for a new Upgrade Module, at 802, the host application responds by indicating that the requested Upgrade Module could not be found.

When the guest process receives the response from the hosting application, at 804 the guest process begins a secure upload of the component to the hosting application. Upon successfully receiving the uploaded component, at 805, the hosting application saves the new Upgrade Module.

At 806, the guest process requests that the newly uploaded Upgrade Module be loaded into a secured portion of the hosting applications process space. At 807, the hosting application loads the Upgrade Module and registers it into the host's running process. Thereafter, at 808k the guest process can request the Upgrade Module, if an upgrade is needed.

Upon notification, at 809, that an upgrade is needed, at 810, the guest process begins a secure upload to the Upgrade Module. Upon successfully receiving the upload, at 811, the Upgrade Module installs the upgrade.

If applicable, at 812, the Upgrade Module may signal a need for an immediate restart of the VM Image, the Host Application or both.

Changing Configuration Settings

Figure 9:
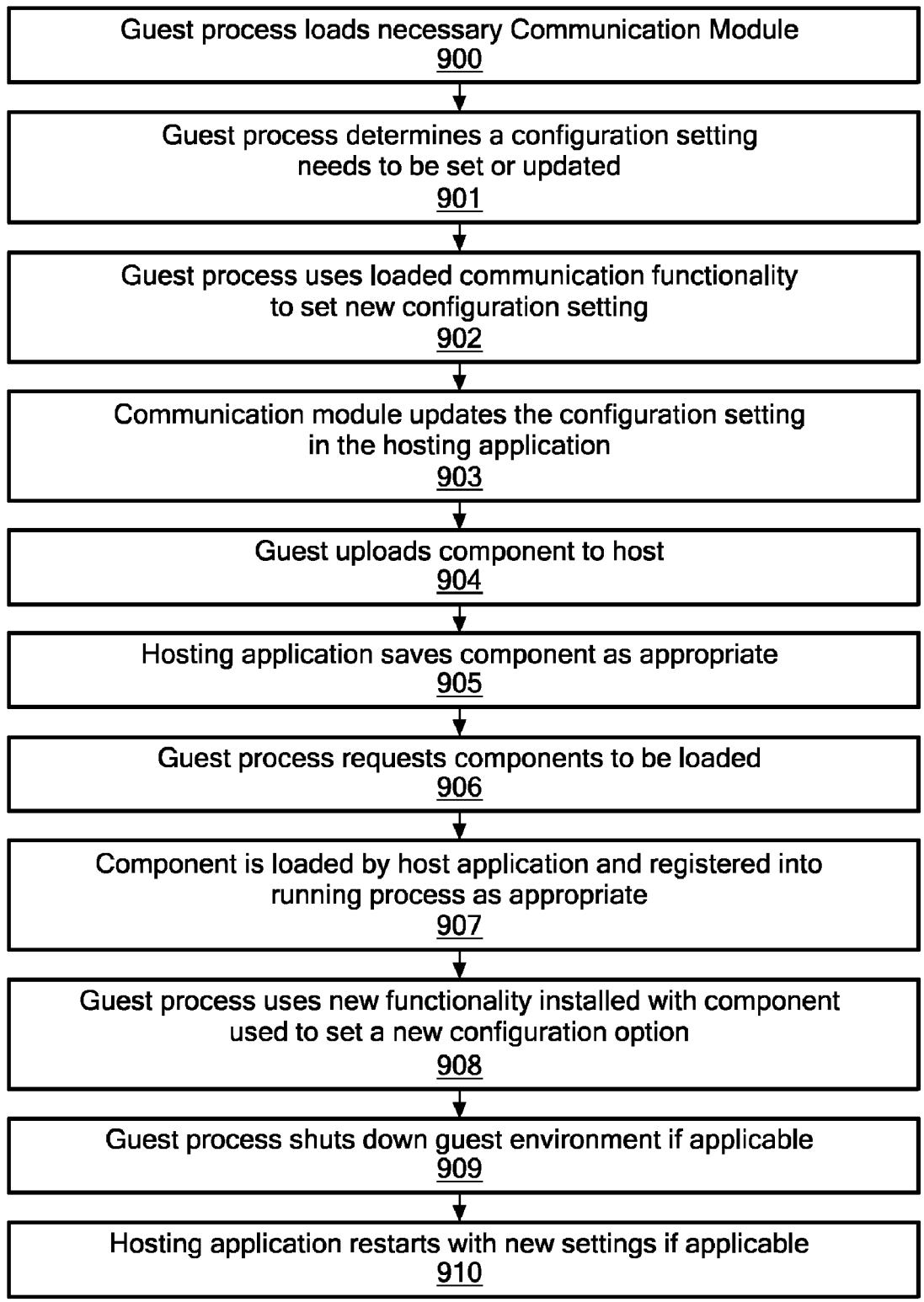
FIG. 9 is a flowchart describing operations related to changing a configuration setting that is not yet installed into the hosting environment, in accordance with an embodiment of the present invention.

FIG. 9 is a flowchart diagram that describes how a guest VM may initiate the installation and subsequent use of new configuration settings in a hosting application. It is assumed for the purposes of the flowchart diagram that, at 900, an appropriate Communication Module has been installed and loaded by the guest process. At some point 901 in the execution of the guest process, it is determined that a new configuration setting needs to be set or an existing configuration setting needs to be changed. At 902, the guest process uses the new functionality of the appropriate Communication Module to request that the new or changed configuration setting be saved by the hosting application.

Upon receiving this setting change request from the guest process, at 903, the hosting application uses facilities provided by the hosting application to securely change the requested configuration setting.

At 904, the guest process securely uploads a component containing the configuration settings to the hosting application. Upon successfully receiving the configuration settings, at 905 the hosting application saves the newly uploaded configuration settings. At 906, the guest process requests the hosting application to load the configuration settings.

At 907, the hosting application loads the component containing the configuration settings and registers the component into the running host application process, as appropriate. At 908, the guest process may utilize the new component and may create a new configuration setting for the hosting application. If appropriate, at 909, the hosting application or the guest process shuts down the guest environment 909. Upon restarting (if applicable), at 910, the guest process may utilize the new configuration setting. Alternatively, the guest environment is suspended and then restarted, rather than being shut down and rebooted.

FIG. 10 depicts an exemplary user interface (UI) progress indicator to the installation of a functional component as described in FIG. 6, in accordance with an embodiment of the present invention.

Software described herein may be stored in a memory and executed by a real or virtual processor. The memory may be random access memory (RAM), read-only memory (ROM), flash memory, virtual memory or any other memory, or combination thereof, suitable for storing control software or other instructions and data. Some of the functions performed by the software have been described with reference to flowcharts. Those skilled in the art should readily appreciate that functions, operations, decisions, etc. of all or a portion of each block, or a combination of blocks, of the flowcharts may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including computer networks. In addition, while the invention may be embodied in software, the functions necessary to implement the invention may alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. Moreover, while the preferred embodiments are described in connection with various illustrative data structures, one skilled in the art will recognize that the system may be embodied using a variety of data structures. Furthermore, disclosed aspects, or portions of these aspects, may be combined in ways not listed above. Accordingly, the invention should not be viewed as limited.

What is claimed is:

1. A method for loading software on a host computer that hosts a virtual machine (VM) and a host operating system (OS), comprising:
  receiving, by the VM, a message from a second computer indicative of a request to load requested software on a host partition of the host computer, the second computer having a communication link with the VM and lacking a communication link with the host partition that passes entirely outside of the VM;
  in response to receiving the message from the second computer, sending a second message from within the VM to a virtual machine manager (VMM) being executed by the host computer, the second message being indicative of a request to load the requested software on the host partition of the host computer; and
  in response to receiving the second message, loading, by the VMM, the requested software onto the host partition of the host computer.

2. The method of claim 1, further comprising:
  in response to determining that the requested software is not installed on the host computer, uploading the requested software from the VM to the host partition of the host computer; and
  installing the uploaded software on the host computer.

3. The method of claim 1, further comprising:
  in response to determining that the requested software is not installed on the host computer, downloading the requested software from a server to the host computer; and
  installing the downloaded software on the host computer.

4. The method of claim 1, sending the second message comprises:
  uploading a software module from the second computer to the VM via a virtual private network connection established between the second computer and the VM; and
  executing the uploaded software module by the VM.

5. The method of claim 1, wherein loading the requested software onto the host partition of the host computer comprises:
  executing at least part of the loaded software by the host partition of the host computer.

6. The method of claim 1, wherein loading the requested software onto the host partition of the host computer comprises:
  storing at least part of the loaded software on a storage device attached to the host computer.

7. The method of claim 1, wherein loading the requested software onto the host partition of the host computer comprises:
  storing at least part of the loaded software in a memory used to store instructions that are executed by the host computer.

8. The method of claim 1, wherein loading the requested software onto the host partition of the host computer comprises:
  modifying existing software on the host partition of the host computer.

9. The method of claim 1, wherein loading the requested software onto the host partition of the host computer comprises:
  augmenting existing software on the host partition of the host computer.

10. The method of claim 1, wherein loading the requested software onto the host partition of the host computer comprises:
  replacing, at least in part, existing software on the host partition of the host computer.

11. The method of claim 1, wherein loading the requested software onto the host partition of the host computer comprises:
  installing an upgrade in the host operating system.

12. The method of claim 1, wherein loading the requested software onto the host partition of the host computer comprises:
  executing virus checking software on the host partition of the host computer.

13. The method of claim 1, wherein loading the requested software onto the host partition of the host computer comprises:
  installing a secure printing module on the host partition of the host computer.

14. A computer-readable medium bearing computer-executable instructions that, when execution by a computer, cause the computer to perform operations comprising:
  receiving, by the VM, a message from a second computer indicative of a request to load requested software on a host partition of the host computer, the second computer having a communication link with the VM and lacking a communication link with the host partition that passes entirely outside of the VM;
  in response to receiving the message from the second computer, sending a second message from within the VM to a virtual machine manager (VMM) being executed by the host computer, the second message being indicative of a request to load the requested software on the host partition of the host computer; and
  in response to receiving the second message, loading, by the VMM, the requested software onto the host partition of the host computer.

15. The computer-readable medium of claim 14, further bearing computer-executable instructions that, when executed by the computer, cause the computer to perform operations comprising:
  in response to determining that the requested software is not installed on the host computer, uploading the requested software from the VM to the host partition of the host computer; and
  installing the uploaded software on the host computer.

16. The computer-readable medium of claim 14, further bearing computer-executable instructions that, when executed by the computer, cause the computer to perform operations comprising:
  in response to determining that the requested software is not installed on the host computer, downloading the requested software from a server to the host computer; and
  installing the downloaded software on the host computer.

17. The computer-readable medium of claim 14, wherein sending the request to the VMM further comprises:
  uploading a software module from a server to the VM via a virtual private network connection established between the second computer and the VM; and
  executing the uploaded software module by the VM.

18. The computer-readable medium of claim 14, wherein loading, by the VMM, the requested software onto the host partition of the host computer further comprises:
  executing at least part of the loaded software by the host partition of the host computer.

19. The computer-readable medium of claim 14, wherein loading, by the VMM, the requested software onto the host partition of the host computer further comprises:
  storing at least part of the loaded software on a storage device attached to the host computer.

20. The computer-readable medium of claim 14, wherein loading, by the VMM, the requested software onto the host partition of the host computer further comprises:
  storing at least part of the loaded software in a memory used to store instructions that are executed by the host computer.

21. The computer-readable medium of claim 14, wherein loading, by the VMM, the requested software onto the host partition of the host computer comprises:
  modifying existing software on the host computer.

22. The computer-readable medium of claim 14, wherein loading, by the VMM, the requested software onto the host partition of the host computer comprises:
  augmenting existing software on the host computer.

23. A system, comprising:
  a virtual machine (VM);
  a virtual machine manager (VMM) configured to support the VM;
  a host operating system (OS);
  a processor; and
  a memory coupled to the processor, the memory bearing processor-executable instructions that, when executed on the processor, cause the system to at least:
    receive, by the VM, a message from a second computer indicative of a request to load requested software on a host partition of the host computer, the second computer having a communication link with the VM and lacking a communication link with the host partition that passes entirely outside of the VM;
  in response to receiving the message from the second computer, send a second message from within the VM to a virtual machine manager (VMM) being executed by the host computer, the second message being indicative of a request to load the requested software on the host partition of the host computer; and
  in response to receiving the second message, load, by the VMM, the requested software onto the host partition of the host computer.

* * * * *